(12) United States Patent
Yang

(10) Patent No.: US 8,495,454 B2
(45) Date of Patent: Jul. 23, 2013

(54) METHODS, APPARATUSES, SYSTEMS, AND ARCHITECTURES FOR QUICKLY AND RELIABLY ENCODING AND/OR DECODING SYSTEM DATA

(75) Inventor: Xueshi Yang, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 735 days.

(21) Appl. No.: 12/501,380

(22) Filed: Jul. 10, 2009

(65) Prior Publication Data
US 2010/0011275 A1    Jan. 14, 2010

Related U.S. Application Data

(60) Provisional application No. 61/080,532, filed on Jul. 14, 2008.

(51) Int. Cl.
*H03M 13/00*    (2006.01)

(52) U.S. Cl.
USPC ........... 714/755; 714/786; 714/766; 714/777; 714/782; 714/794; 714/795; 375/342; 375/262

(58) Field of Classification Search
USPC ......... 714/755, 786, 766, 777, 782, 794–795; 375/262, 342
See application file for complete search history.

(56) References Cited

U.S. PATENT DOCUMENTS

2007/0268905 A1* 11/2007 Baker et al. ................... 370/392

* cited by examiner

*Primary Examiner* — Guy Lamarre

(57) ABSTRACT

Methods, apparatuses, systems, and architectures for providing fast, independent, and reliable retrieval of system data (e.g., metadata) from a storage system, which enables minimal degradation in the reliability of user data. Methods generally include encoding the system data at least twice, at least once independently and at least once jointly along with user data. Methods can also include decoding the system data first, and upon a decoding failure, jointly decoding the system data and the user data.

19 Claims, 9 Drawing Sheets

FIG. 1
(Conventional)
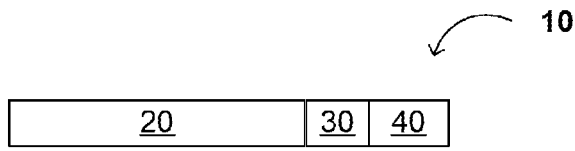
FIG. 2
(Conventional)
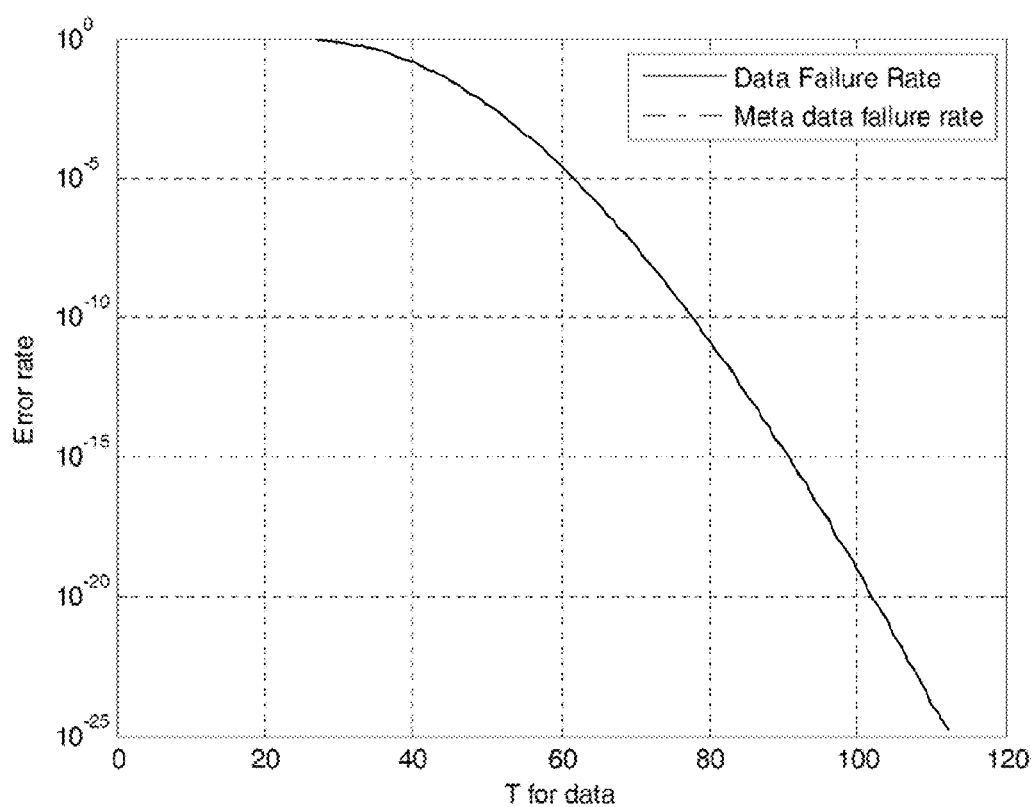

FIG. 3
(Conventional)
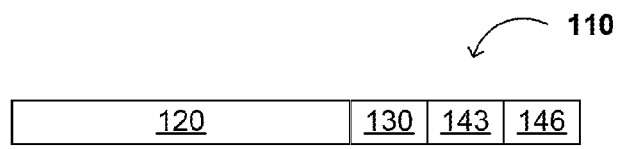
FIG. 4
(Conventional)
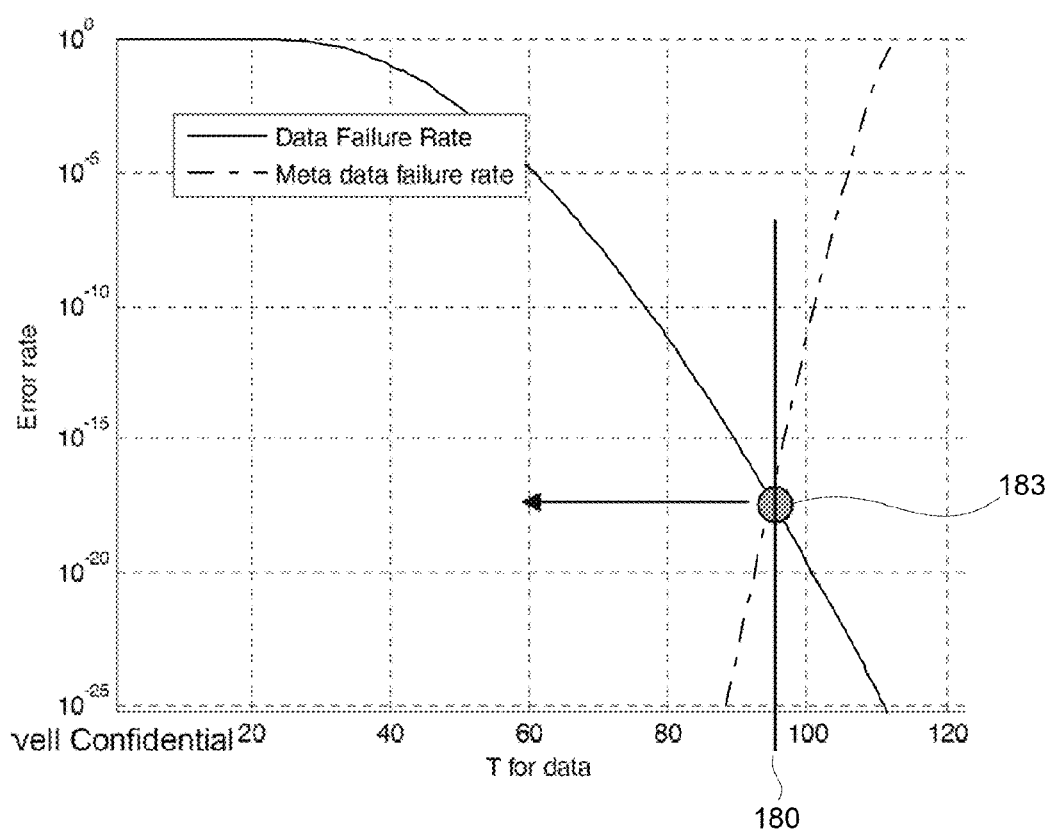

METHODS, APPARATUSES, SYSTEMS, AND ARCHITECTURES FOR QUICKLY AND RELIABLY ENCODING AND/OR DECODING SYSTEM DATA

RELATED APPLICATIONS

This application claims the benefit of U.S. Provisional Application No. 61/080,532, filed Jul. 14, 2008, incorporated herein by reference in its entirety.

FIELD OF THE INVENTION

The present invention generally relates to the field of data storage and retrieval. More specifically, embodiments of the present invention pertain to methods, apparatuses, systems, and architectures for encoding system data (or metadata) more than once.

BACKGROUND

In some conventional data storage systems, such as those employing hard disk drives, compact disks, digital versatile disks (DVDs), flash memories, and random access memories, the so-called user data and metadata can be stored in a common sector. The user data can include data such as, for example, documents, photographs, audio files, media files, operating files, and the like. Additional information about the user data can be generated by the system and may correspond to, for example, the length and/or location of the user data, the time that the user data was created, the type of user data, the protection status of the user data, and the like. This additional information is sometimes referred to as system data, or metadata. In general, the user data occupies significantly more storage space than does the corresponding metadata. To facilitate system operations such as data organization, indexing and searching, storage systems often need access only to the metadata.

Some conventional data storage systems may also incorporate error correction and/or error detection to ensure reliable storage and retrieval of both the user data and metadata. For example, redundancy data may be generated from the corresponding user data and/or metadata by employing error correction algorithms such as Bose-Chaudhuri-Hocquenghem (BCH) encoding, Reed-Solomon encoding, Low-Density Parity-Check encoding, Hamming encoding, Reed-Muller encoding, binary Golay encoding, Viterbi encoding, Turbo encoding, Optimal Rectangular encoding or iterative encoding, or by employing error detecting algorithms such as parity bits, checksums, or Cyclic Redundancy Checking. Redundancy data is typically stored in the same sector as the user data and metadata.

Referring to the examples of FIGS. 1 and 2, some conventional architectures include storing user data 20, metadata 30, and redundancy data 40 in the same sector 10 of a storage system, where redundancy data 40 corresponds to jointly encoded user data 20 and metadata 30. Jointly encoding the user data and metadata (i.e., encoding the user data and metadata together as a single serial data stream) provides for more reliable storage and retrieval of the user data. Assume for purposes of illustration and without limitation, that in each sector 10, 4 kilobytes are allocated to user data 20 and 80 bytes are allocated to metadata. If redundancy data 40 is generated corresponding to 16-bit BCH encoding of user data 20 and metadata 30 jointly, it is observed that, when the BCH error correction power (T) equals 60 (corresponding to about T*16 bits of binary data) are allocated to redundancy data 40, the failure rate probability of decoding both the user data and the metadata is about $10^{-5}$. Similarly, when T=117 (corresponding to about 117*16 bits of binary data) are allocated to redundancy data 40, the failure rate probability of decoding both the user data and the meta data is about $10^{-25}$. However, because redundancy data 40 is generated from both user data 20 and metadata 30, both user data 20 and metadata 30 must be read and jointly decoded, even when it desired only to retrieve the metadata 30. Thus, some conventional architectures, while enabling superior reliability of data storage and retrieval, do not enable high throughput retrieval of the metadata alone.

Thus, in some other conventional architectures, two sets of redundancy data are provided—one corresponding to the user data alone and one corresponding to the metadata alone. In these schemes, the metadata may be decoded with its corresponding redundancy data independently of the user data, thus enabling higher throughput retrieval of the metadata alone. Referring to the examples of FIGS. 3 and 4, user data 120, metadata 130, first redundancy data 143 corresponding to user data 120, and second redundancy data 146 corresponding to metadata 130 are stored in the same sector 110 of a storage system. However, the total space allocated to redundancy data is now shared between first redundancy data 143 and second redundancy data 146, which may increase the overhead cost and/or reduce the capabilities of error checking and/or correction (ECC).

Consider again the example where the redundancy data is generated corresponding to 16-bit BCH encoding, 4 kilobytes are allocated to user data 120, 80 bytes are allocated to metadata 130, and the total available space allocated for the encoded redundancy data (i.e., first redundancy data 143 and second redundancy data 146) is 220 bytes. In other words, if 16-bit BCH encoding is used, the total error correction power T_total=110. As illustrated, when a greater number of bits are allocated to second redundancy data 146, a lesser number of bits are available for allocation to first redundancy data 143, therefore resulting in a higher failure rate probability of user data 120. If it is desired for the metadata to have a failure rate probability less than or equal to the user data failure rate probability, the respective allocation of bits to the first and second redundancy data must satisfy (e.g., be at or to the left of) solution line 180. Thus, for error checking and/or correction of metadata 130 to be as reliable as user data 120, no more than about T=95 (corresponding to 95*16 bits) must be allocated to first redundancy data 143 (see, e.g., solution point 183). As a result, about T=15 (corresponding to 15*16 bits) are available for allocation to second redundancy data 146 (e.g., the difference between the total ECC correction power [117] and the ECC correction power allocated to the first redundancy data [95]). In this case, the failure rate probability of the user data is about $10^{-17}$ (in contrast to $10^{-25}$ for the joint encoding architecture of FIGS. 1 and 2). Therefore, while independent encoding of user data and metadata provides for higher throughput retrieval of metadata alone, it does not provide superior reliability of data storage and retrieval.

On the other hand, increasing the number of ECC bits to separately error check and/or correct decoded user data and metadata would not only increase the amount of memory consumed, but also the complexity of the error checking and/or correction logic. A need therefore exists to provide for fast, independent, and reliable retrieval of metadata alone wherein there is minimum degradation in the reliability of user data.

SUMMARY

Embodiments of the present invention relate to methods, apparatuses, systems, and architectures for encoding system data (or metadata) a multiple number of times. More particularly, embodiments of the present invention concern encoding metadata at least twice, at least once independently and at least once jointly along with user data.

In some embodiments, methods of storing data having a user data portion and a metadata portion in a storage system can include encoding the user data and the metadata with a first redundancy code having a length of R; encoding the metadata with a second redundancy code having a length of P; and writing each of the user data, the metadata, the first redundancy code, and the second redundancy code together in the storage system. Algorithm(s) and/or software can generally be configured to implement such methods and/or any process or sequence of steps embodying the inventive concepts described herein.

In additional embodiments, methods of recovering a portion of data having a plurality of portions, where the first and second portions of the data are jointly encoded with a first redundancy code, the second portion is encoded (separately) with a second redundancy code, and the first and second portions and first and second redundancy codes are written together in a storage system, can include reading from the storage system a portion of data corresponding to the second portion and a portion of the data corresponding to the second redundancy code; decoding the second portion with the second redundancy code; and indicating whether the second portion was successfully decoded with the second redundancy code. Algorithm(s) and/or software can be similarly configured to implement such methods and/or any process or sequence of steps embodying the inventive concepts described herein. In various embodiments, the first portion comprises user data and the second portion comprises metadata.

In other embodiments, a data encoder can include at least one input receiving a first portion of data (e.g., user data) and (an associated) second portion of data (e.g., metadata) to be written to a storage medium; logic configured to generate (i) a first redundancy code corresponding to both the first and second data portions and (ii) a second redundancy code corresponding to the second data portion without the first data portion; and an output providing an encoded data signal to a data recording mechanism of the storage medium, wherein the encoded data signal comprises the first and second data portions, the first redundancy code, and the second redundancy code.

In yet other embodiments, a data decoder can include an input receiving a stored data signal from a storage medium, where the stored data signal comprises (i) a representation of both first and second data portions (e.g., user data and associated metadata) jointly encoded by a first redundancy code and (ii) a representation of the second data portion encoded by a second redundancy code; and logic configured to decode the stored data signal and provide the second data portion read from the storage medium.

In further embodiments, systems for storing digital data having a first portion and a second portion can include a data storage medium having a plurality of writable sectors; encoding logic generating at least two redundancy codes corresponding to the digital data, wherein a first of the two redundancy codes comprises an error correcting code corresponding to the first portion (or first and second portions) of the digital data and a second of the two redundancy codes comprises an error correcting code corresponding to the second portion of the digital data; a data recording mechanism configured to write the digital data and the at least two redundancy codes in one of the writable sectors; a reader configured to read a representation of the digital data and a representation of the redundancy codes from the (one) writable sector; and decoding logic configured to decode the digital data from the (one) writable sector.

In still further embodiments, encoder, decoder and/or error checking and correction architectures can include encoders, decoders, and/or any other circuit(s) embodying the inventive concepts described herein.

The present invention advantageously provides fast, independent, and reliable retrieval of metadata alone wherein there is minimum degradation in the reliability of data. These and other advantages of the present invention will become readily apparent from the description of exemplary embodiments below.

BRIEF DESCRIPTION OF THE DRAWINGS

FIG. 1 is a diagram showing a conventional data storage architecture, where the user data and the metadata are jointly encoded.

FIG. 2 is a graph showing typical failure rate probabilities of the architecture of FIG. 1.

FIG. 3 is a diagram showing a conventional data storage architecture, where the user data and the metadata are separately encoded.

FIG. 4 is a graph showing typical failure rate probabilities of the architecture of FIG. 3.

DETAILED DESCRIPTION

Figure 5:
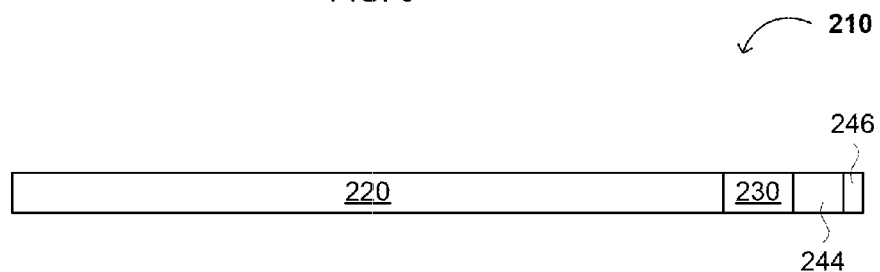
FIG. 5 is a diagram showing an exemplary data storage architecture in accordance with embodiments of the present invention.

Reference will now be made in detail to various embodiments of the invention, examples of which are illustrated in the accompanying drawings. While the invention will be described in conjunction with the exemplary embodiments provided below, the embodiments are not intended to limit the invention. On the contrary, the invention is intended to cover alternatives, modifications and equivalents that may be included within the scope of the invention as defined by the appended claims. Furthermore, in the following description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "generating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture. Also, for convenience and simplicity, the terms "data," "code," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

Exemplary Methods for Storing Metadata

In one aspect, the present invention concerns methods for encoding metadata at least twice, at least once independently and at least once jointly along with user data. Referring to the exemplary illustrations of FIGS. 5 and 6, in accordance with embodiments of the present invention, user data 220, metadata 230, first redundancy data 244, and second redundancy data 246 can be stored in the same sector 210 of a data storage system. As discussed more fully below, in some examples, and without limitation, first redundancy code 244 can correspond to the error checking and/or correction code created by jointly encoding user data 220 and metadata 230, and second redundancy code 246 can correspond to the error checking and/or correction code created by encoding metadata 230 independent of user data 220. In one implementation, the second redundancy code 246 results from encoding the metadata 230 by itself (e.g., encoding digital data consisting of the metadata 230). Encoding the metadata at least once, exclusive of the user data, allows for independent reading and/or decoding of the metadata 230. This enables faster and/or more accurate reading of the metadata in data storage systems, which can also result in substantial performance improvements in file system operations.

In addition, jointly encoding the metadata and user data also enables the metadata to be as reliable as the user data. For example, and without limitation, suppose that for a given sector 210 of a data storage system, 4 kilobytes are allocated to user data 220, 80 Bytes are allocated to metadata 230, and a total of 220 bytes are available for first redundancy code 244 and second redundancy code 246. Suppose further, for example, and without limitation, that first redundancy code 244 is a 16-bit BCH code corresponding jointly to user data 220 and metadata 230, and that second redundancy code 246 is a 16-bit BCH code corresponding only to metadata 230, in which case the total storage allocated to all redundancy bits (220 bytes) corresponds to an error correction power of 110. Referring to the graph of FIG. 6, when an error correction power P=95 (see, e.g., solution point 253) is allocated to first redundancy code 244, for example, up to R=15 is available for allocation to second redundancy code 246. Such allocation would provide independent metadata recovery with a decoding failure rate probability of about $10^{-17}$, and would also provide joint metadata and user data recovery with a decoding failure rate probability of about $10^{-17}$. However, and in contrast to some conventional independent encoding architectures (for example, the architecture illustrated in FIGS. 3 and 4), embodiments of the present invention provide allocation solution lines (for example, and without limitation, solution line 250) that can be located to the right of solution point 253.

For example, and without limitation, in one implementation, an error correction power R=108 can be allocated to first redundancy code 244 (see, e.g., solution point 258 on solution line 250 where it crosses data decoding failure rate curve 251), and P=2 can be allocated to second redundancy code (see, e.g., solution point 256 on solution line 250 where it crosses metadata decoding failure rate curve 252). As indicated, such allocation may provide independent metadata recovery with, for example and without limitation, a failure rate probability of about $10^{-5}$, and joint metadata and user data recovery with, for example and without limitation, a failure rate probability of about $10^{-23}$. Accordingly, for system operations which only need access the metadata, in some embodiments, metadata 230 may first be independently decoded with comparatively "weak" second redundancy code 246, having a failure rate probability of about $10^{-5}$. Thereafter, if the metadata is not successfully recovered, metadata 230 may be recovered by jointly decoding user data 220 and metadata 230 with comparatively "strong" first redundancy code 244, having a more reliable failure rate probability of about $10^{-23}$. Thus, the metadata can be encoded at least twice: once with a "weak" redundancy code which enables fast and independent recovery of the metadata, and once with a "strong" redundancy code which enables more reliable recovery of both the metadata and the user data.

Other allocations of bits to the redundancy codes are contemplated in accordance with embodiments of the present invention. For example, without limitation, and as indicated in the exemplary graph of FIG. 6, P=17 can be allocated to the second redundancy code (thus providing a failure rate probability of about $10^{-12}$), and R=93 can be allocated to the first redundancy code (thus providing a failure rate probability of about $10^{-20}$). While the foregoing examples involve 16-bit BCH-type encoding with particular sector size allocations to the user data, the metadata, and the recovery code(s), it is well within the abilities of one skilled in the art to use different sector size allocations and/or other types of encoding. For example, and without limitation, first redundancy code may correspond to 16-bit BCH encoding while second redundancy code may correspond to 8-bit BCH encoding. It is well within the abilities of those skilled in the art to mathematically solve the corresponding encoding equations to provide different bit allocations to the redundancy code(s) and thereby provide different failure rate probabilities.

Encoding the metadata and user data together enables the metadata to be as reliable as the user data. In the embodiment of FIG. 5, for a given sector 210 of a data storage system, X kilobytes are allocated to user data 220, Y kilobytes are allocated to metadata 230, and a total of R+P bytes are available for first redundancy code 244 (R) and second redundancy code 246 (P). The size of the data sector and the specific amounts of memory/storage allocated to user data, metadata, and redundancy code (e.g., error checking and/or correction code) generally depend on the data storage medium (e.g., a magnetic disk such as a hard disk drive, an optical disk such as CD-ROM or DVD, a nonvolatile memory such as a flash memory drive or flash memory stick, a random access memory such as that used in a network switch or network buffer, etc.), and such values are standardized or generally known in the art.

Figure 6:
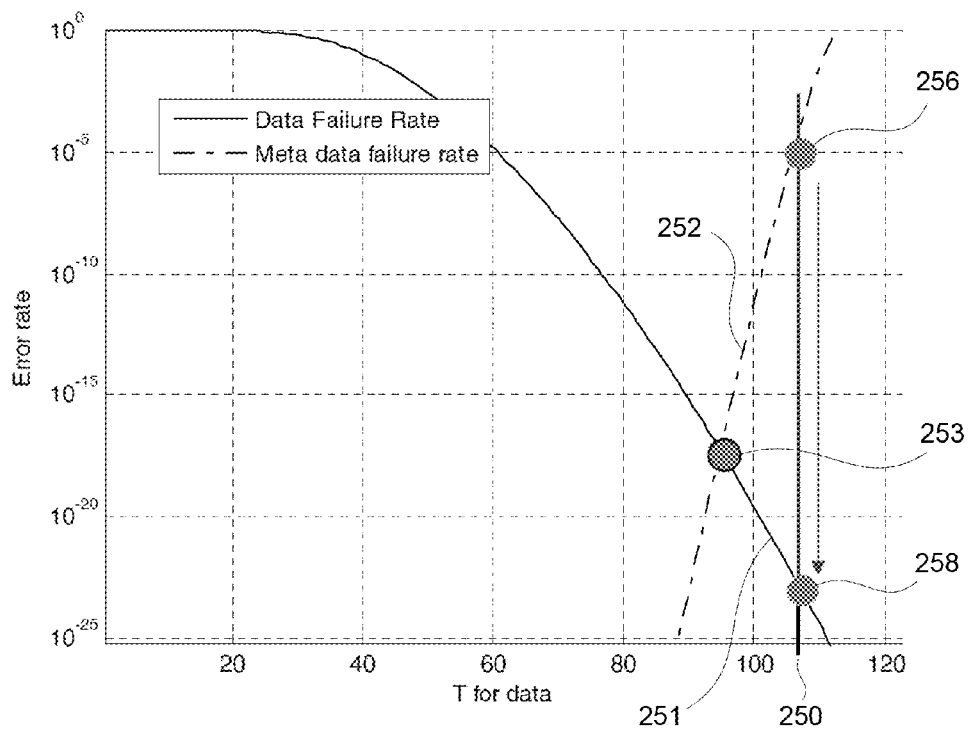
FIG. 6 is a graph showing typical failure rate probabilities of the architecture of FIG. 5.

FIG. 6 is a graph of the failure rate ("Error rate") of decoding user data vs. decoding metadata for the embodiment of FIG. 5, encoded as 16-bit BCH code (where X=4 kilobytes in sector 210, Y=80 bytes in sector 210, and R+P=220 bytes of parity bits), as a function of the error correction power R allocated to the first redundancy code 244. In the embodiment of FIG. 6, the first and second redundancy codes 244 and 246 respectively correspond to (i) user data 220 and metadata 230 together and (ii) metadata 230 alone. Data failure rate line 251 and the crossover point 253 in the graph of FIG. 6 show that relatively reliable decoding of user data 220 and metadata 230 together occurs when an error correction power of more than P=95 is allocated to the first redundancy code 244 (i.e., R>95*16 bits). Such an allocation provides recovery of user data and metadata together with a failure rate probability of about $10^{-17}$. However, even with an error correction power of less than P=15 available for allocation to second redundancy code 246 (see metadata failure rate line 252 and solution point 253), metadata can be successfully decoded with reasonable reliability.

Thus, in general, a graph of the failure rate of decoding user data and metadata together vs. decoding metadata alone as a function of the amount of redundancy storage allocated to the first redundancy code 244, and a crossover point (at which the two failure rate curves cross, for example solution point 253 in FIG. 6) can be determined. The failure rate at the crossover point can be designated $F_{CR}$, and the amount of redundancy storage allocated to the first and second redundancy codes can be designated $R_{CR}$ and $P_{CR}$, respectively. In various embodiments of the invention, the amount of storage R (e.g., in bytes or bits) allocated to the first redundancy code relative to the amount of storage P allocated to the second redundancy code 246 may be represented by the formula $R/P > R_{CR}/P_{CR}$. For example, R/P may be greater than or equal to $1.1*(R_{CR}/P_{CR})$, $1.2*(R_{CR}/P_{CR})$, $1.5*(R_{CR}/P_{CR})$, or any other minimum value greater than $R_{CR}/P_{CR}$. Alternatively or additionally, $R_{CR}$ and $P_{CR}$ may be selected such that the failure rate $F_{USER}$ for decoding user data and metadata together is less than $F_{CR}$, and the failure rate $F_{META}$ for decoding user metadata alone is greater than $F_{CR}$. In various implementations, the failure rate $F_{USER}$ may be less than $F_{CR}/10$, $F_{CR}/100$, $F_{CR}/1000$, or any other maximum value less than $F_{CR}$, and the failure rate $F_{META}$ may be greater than $F_{CR}*10$, $F_{CR}*100$, $F_{CR}*1000$, or any other minimum value greater than $F_{CR}$. For example, the failure rate $F_{USER}$ may be less than or equal to $10^{-20}$, and the failure rate $F_{META}$ may be greater than or equal to $10^{-5}$.

Figure 7:
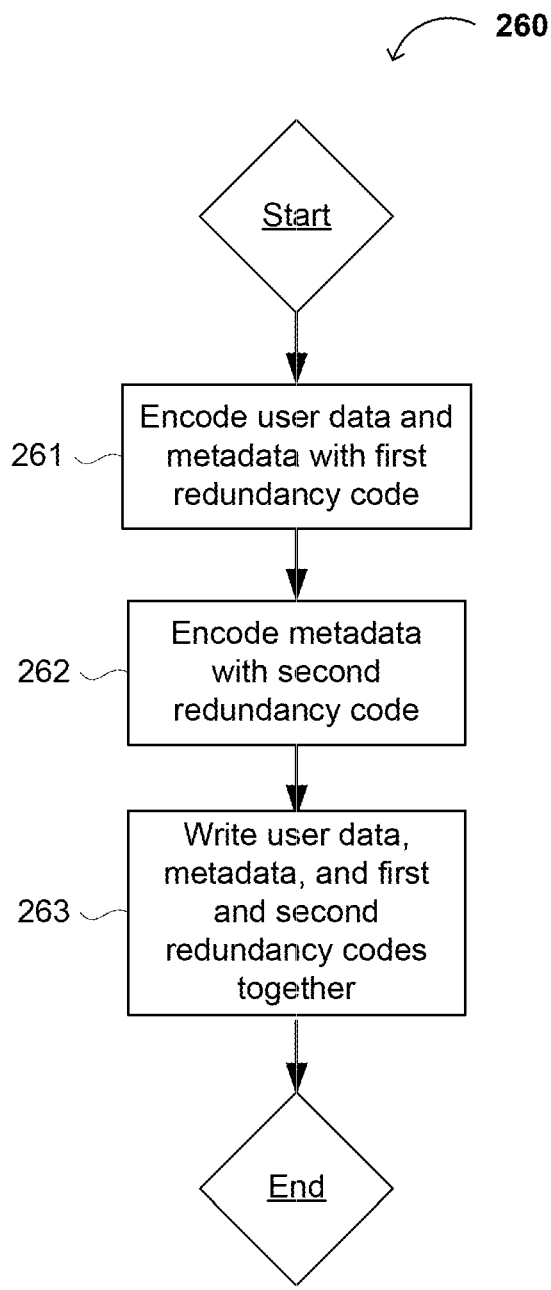
FIG. 7 is a flow chart showing an exemplary method of encoding data in accordance with embodiments of the present invention.

Referring now to the example illustrated in FIG. 7, an exemplary method 260 of storing data includes encoding user data and metadata together with a first redundancy code (or first redundancy data) in step 261. Next, the method 260 includes encoding metadata, independently of user data, with a second redundancy code (or second redundancy data) in step 262. In some examples, step 261 may be performed before step 262 is performed. In other examples, step 262 can be performed before step 261 is performed. In yet other examples, steps 261 and 262 can be performed simultaneously. For example, and without limitation, user data and metadata can be stored in two buffers, and logic may be configured to (i) encode the user data and metadata corresponding to a first redundancy code and (ii) encode the metadata corresponding to a second redundancy code. As discussed below, one or more of the redundancy codes may be polynomial coefficients of an encoding algorithm, which in various embodiments is implemented as additional data generated as a result of passing the data through convolutional logic. It is within the abilities of those skilled in the art to use and implement both first and second redundancy codes to provide for reliable data storage and relatively fast retrieval of metadata.

After the user data and the metadata has been encoded with the first redundancy code, and the metadata has been encoded with the second redundancy code, the user data, the metadata, and the redundancy data (or redundancy codes) is written in step 263 to a storage system. In some implementations, the data and the redundancy codes are written to a storage system that includes a hard drive disk. In various other implementations, the user data, the metadata and the redundancy codes are written to a storage system which can include a compact disk and/or a digital versatile disk (DVD). In yet other implementations, the user data, the metadata and the redundancy codes are written to a storage system including one or more flash-based or other nonvolatile memories, one or more random access memories, and/or one or more read only memories.

In further embodiments, the data and the redundancy codes can be written to a common sector of the storage system. For example, and without limitation, the data and codes can be written to the same physical sector of a hard disk drive. In other examples, the data and codes can be written to sequential frames of one or more sector(s) of a compact disk or DVD. In yet other examples, the data and codes can be written to sequential pages and/or blocks of one or more flash-based memories. It is within the abilities of those skilled in the art to appreciate other similar sector-based partitioning schemes wherein the user data, the metadata and the redundancy codes can be stored together and thus retrieved together.

In some embodiments, the first redundancy code includes an error correcting code. In some specific implementations, the error correcting code can be a Bose-Chaudhuri-Hocquenghem (BCH) code. For example, and without limitation, the first redundancy code can include an n-bit BCH code with a particular generator polynomial selected to correct multiple random error patterns particularly characteristic of the storage system employed (e.g., a hard drive, a nonvolatile memory [e.g., flash memory drive], or a digital versatile disk, which have different characteristics for error patterns that occur most frequently). In other examples, and without limitation, the first redundancy code can include a LDPC code when the storage system includes random access memory because of its capability to correct soft errors. However, in accordance with some embodiments of the present invention, the error correcting code can be selected from the group consisting of a Bose-Chaudhuri-Hocquenghem code, a Reed-Solomon code, a Low-Density Parity-Check code, a Hamming code, a Reed-Muller code, a Binary Golay code, a Viterbi code, a Turbo code, an Optimal Rectangular code, an iterative code, and combinations thereof. It is within the abilities of those skilled in the art to select the type, coefficient, and factors of error correcting codes to be employed in conjunction with embodiments of the present invention.

In some embodiments, the second redundancy code can also include an error correcting code. As above, in accordance with some embodiments of the present invention, the error correcting code can be selected from the group consisting of a Bose-Chaudhuri-Hocquenghem code, a Reed-Solomon code, a Low-Density Parity-Check code, a Hamming code, a Reed-Muller code, a Binary Golay code, a convolutional code, a Turbo code, an Optimal Rectangular code, an iterative code, and combinations thereof. The first and the second redundancy codes can include the same type of error correcting code (for example, they can both include a BCH code). Alternatively, the first and the second redundancy codes can include different types of error correcting codes. For example, and without limitation, the first redundancy code can include a BCH code and the second redundancy code can include an iterative code. It is to be appreciated that the type of error correcting code to be employed can be a function of not only the particular storage system employed, but also characteristics of the data encoded.

As demonstrated above, the metadata may be encoded independently from the user data by a second, "weaker" redundancy code. While providing for fast and independent retrieval of the metadata, the "weaker" independent encoding and/or decoding of the metadata may have a higher failure rate probability than the joint encoding and/or decoding of the metadata and user data. It therefore may be desirable to add additional error protection to the process of encoding the metadata alone. Thus, in further embodiments, the second redundancy code can also include an error detecting code selected from the group consisting of one or more parity bits, a checksum, a Cyclic Redundancy Check (CRC), and combinations thereof. For example, and without limitation, the second redundancy code may optionally further include a CRC code to mitigate the potential of correction errors which may be introduced by the error correction code. In other examples, the second redundancy code may include a single parity bit for indicating the parity of the metadata.

As explained above, the first redundancy code may have a length of R and the second redundancy code may have a length of P. For example, referring to the exemplary embodiment of FIGS. 5-6, out of the 220 bytes of total redundancy bits available, the first redundancy code may have a length (e.g., R) of from 200 to 210 bytes (e.g., 200 bytes in one example, and 208 bytes in another example), and the second redundancy code may have a length (e.g., P) of from 10 to 20 bytes (e.g., 20 bytes in one example, and 12 bytes in another example). It is to be appreciated that other allocations are also contemplated in accordance with embodiments of the present invention.

In some specific implementations, R and P can correspond to failure rate probabilities of F and H, respectively, wherein F can be less than or equal to H. For example, referring to FIG. 6, when the first redundancy code has a length R of 208 bytes, it corresponds to a failure rate probability of about $10^{-23}$, and when the second redundancy code has a length P of 12 bytes, it corresponds to a failure rate probability of about $10^{-5}$. In other examples, and without limitation, first and second redundancy codes having lengths of 200 bytes and 20 bytes, respectively, correspond to respective failure rate probabilities of about $10^{-20}$ and about $10^{-12}$. It is to be appreciated that other failure rate probabilities are contemplated in accordance with embodiments of the present invention.

In further embodiments, methods of encoding metadata can further include the step of encoding the metadata with a third redundancy code having a length of S. For example, the metadata can be encoded (i) once jointly with the user data, (ii) once, independently from the user data, with a weaker redundancy code, and (iii) once, also independently from the user data, with a stronger redundancy code. In other examples, the metadata can be encoded (i) once jointly with the user data, (ii) once independently from the user data, and (iii) once jointly with one or more portions of the user data. In some implementations, R, S, and P can correspond to failure rate probabilities of F, G, and H, respectively, wherein F is less than G, and G is less than H. For example, R (i.e., the length of the first redundancy code, and which corresponds to the jointly encoded user data and metadata) can be 190 bytes, S (i.e., the length of the third redundancy code which can correspond, in some examples and without limitation, to the "strong" independent encoding of the metadata) can be 20 bytes, and P (i.e., the length of the second redundancy code which can correspond, in some examples and without limitation, to the "weak" independent encoding of the metadata) can be 10 bytes. As allocated, and referring to the 16-bit BCH failure probability curves as illustrated in FIG. 6, in some examples and without limitation, the failure rate probabilities for the first, second, and third redundancy codes can be about $10^{-17}$, $10^{-12}$, and $10^{-3}$, respectively. It is to be appreciated, however, that other allocations are contemplated in accordance with embodiments of the present invention.

Exemplary Methods for Recovering Metadata

Aspects of the present invention relate to methods of recovering metadata that has been encoded at least once individually and once together with user data. In some embodiments, wherein (i) the metadata and user data are jointly encoded with a first redundancy code, (ii) the metadata is encoded with a second redundancy code, and (iii) the metadata, the user data, the first redundancy code, and second redundancy code are written together in a storage system, the method can include reading the metadata and the second redundancy from the storage system; decoding the metadata with the second redundancy code; and indicating whether the metadata was successfully decoded.

Figure 8:
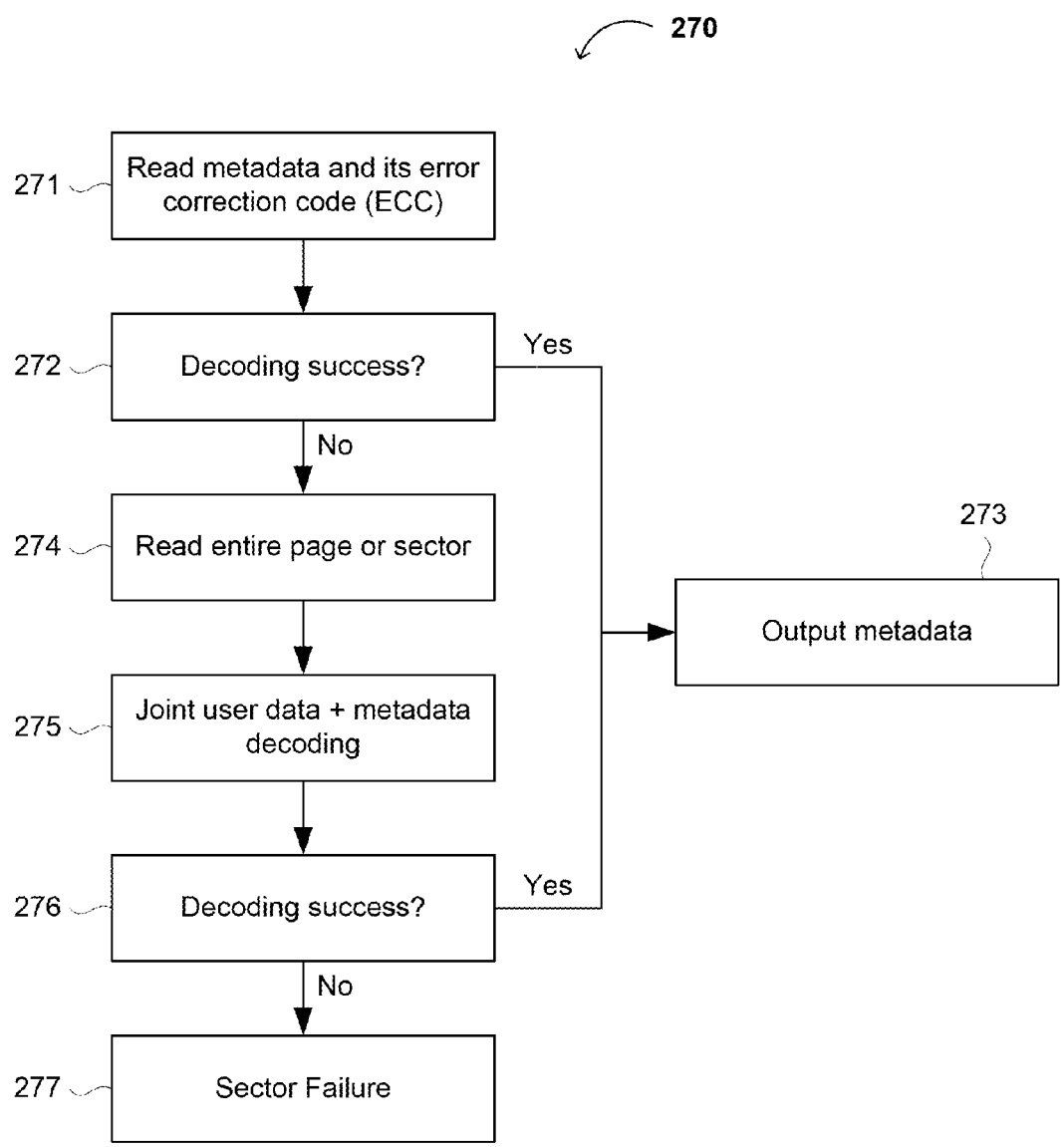
FIG. 8 is a flow chart showing an exemplary method of decoding data in accordance with embodiments of the present invention.

FIG. 8 illustrates an exemplary method 270 of recovering metadata that includes reading from the storage system a portion of data including the metadata and a portion of data including the second redundancy code in step 271. After decoding the metadata with the second redundancy code, the method 270 then determines whether the metadata was successfully recovered in step 272. In some embodiments, the step of indicating whether the metadata was successfully decoded can include error checking the decoded metadata. For example, and without limitation, when the second redundancy code comprises a parity bit, the parity of the decoded metadata can be computed and compared to such parity bit. In other examples, the metadata may be encoded with an error correcting and detecting code (for example, and without limitation, a Hamming code) which can detect and/or correct a particular number of errors. It is within the abilities of those skilled in the art to apply these and other specific ways of determining whether the metadata was successfully decoded. If the metadata was successfully decoded, it is output (e.g., displayed to the user) in a conventional manner in step 273.

In the exemplary embodiment, when the metadata was not successfully decoded with the second redundancy code, the method further includes the steps of reading from the storage system the user data, the metadata and the first redundancy code stored in the page or sector (step 274); jointly decoding the user data and the metadata with the first redundancy code (step 275); and determining whether the user data and the metadata were successfully decoded with the first redundancy code (step 276). Thus, the exemplary method 270 may also include the additional steps of attempting to recover the metadata by jointly decoding the metadata and the user data with the first redundancy code. In some examples, and without limitation, the metadata read in step 271 may be reused in the decoding step 275. In other examples, the metadata can be re-read in step 274.

After joint decoding 275, the metadata can be recovered, and as illustrated by step 275, the method can include the step 273 of outputting the metadata when it is successfully recovered. As above, in some examples and without limitation, step 276 can include parity checking the recovered metadata, or similar error detecting methods. In further embodiments, when the metadata is not successfully decoded with the first redundancy code, the method can include indicating a (sector) read failure (step 277).

Figure 9:
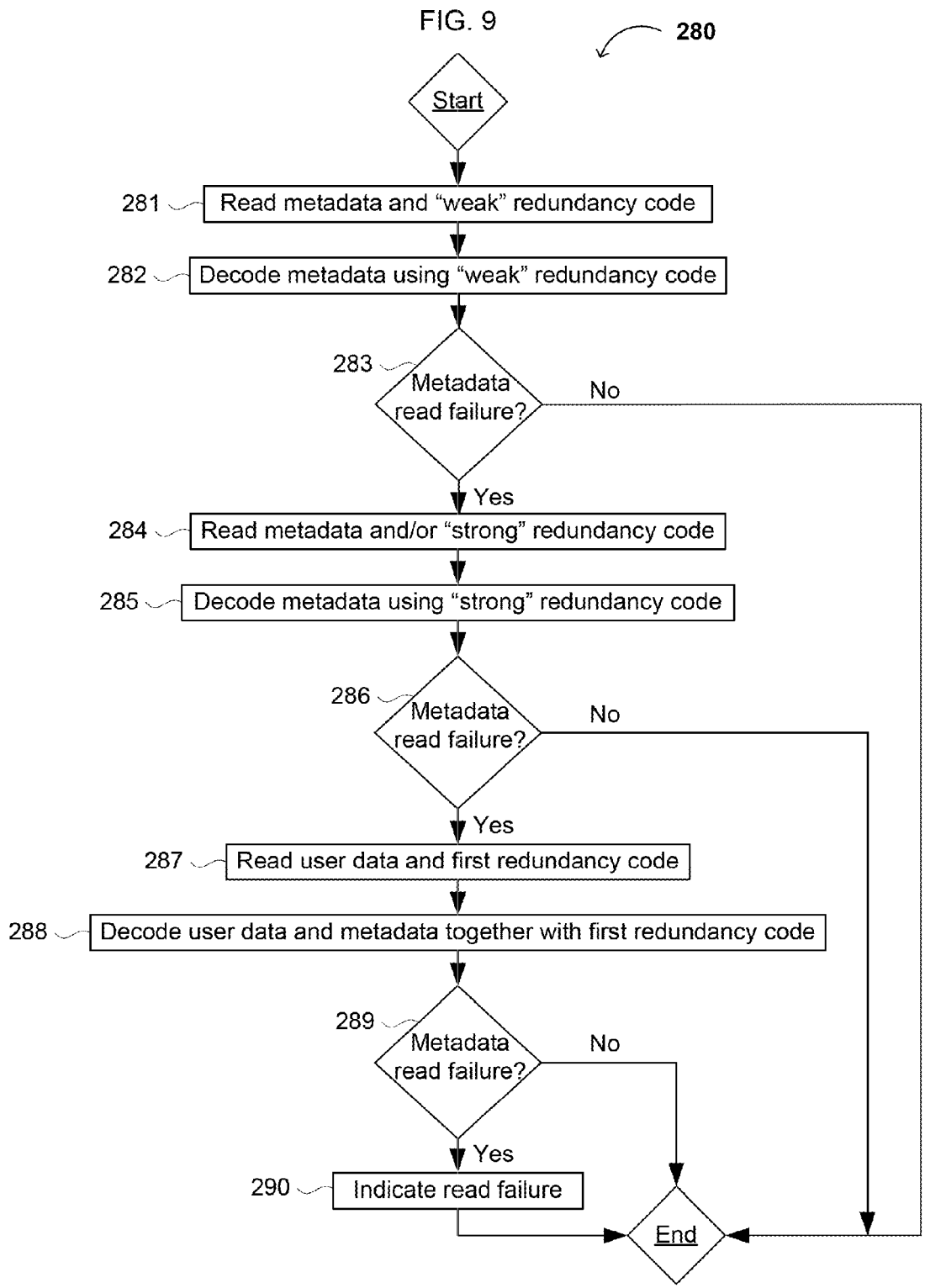
FIG. 9 is a flow chart showing an alternative method of decoding data in accordance with embodiments of the present invention.

Referring now to the example illustrated in FIG. 9, exemplary method 280 of recovering metadata can include step 281 of reading from the storage system a portion of data including the metadata and a portion of data including a "weak" redundancy code as described above. The exemplary method 280 decodes the metadata with the weak redundancy code in step 282 and indicates in step 283 whether the metadata was successfully recovered. In some embodiments, as explained above, the step of indicating whether the metadata was successfully decoded can include error checking the decoded metadata. If the metadata are successfully decoded, the metadata are output (e.g., by displaying the metadata or a representation thereof to the user).

In various embodiments, when the metadata are not successfully decoded with the weak redundancy code, the method 280 can further include reading from the storage system a portion of data including a "strong" redundancy code; decoding the metadata with the strong redundancy code; and indicating whether the metadata were successfully decoded. Thus, exemplary method 280 may also include attempting to recover the metadata by decoding the metadata with a third, relatively strong redundancy code. In some examples, and without limitation, the metadata read in step 281 may be reused in the decoding step 285. In other examples, the metadata can optionally be re-read in step 284. As explained above, the step of indicating whether the metadata was successfully decoded can include error checking the decoded metadata. If the metadata are successfully decoded, the metadata are output (e.g., by displaying the metadata or a representation thereof to the user).

However, when the metadata are not successfully decoded with the strong redundancy code, the method 280 further includes reading from the storage system a portion of data including the user data and a portion of data including the first redundancy code in step 287; jointly decoding the user data and the metadata with the first redundancy code in step 288; and indicating whether the user data and the metadata were successfully decoded in step 289. Thus, exemplary method 280 also includes attempting to recover the metadata by jointly decoding the metadata and the user data with a fixed joint redundancy code. In some examples, the metadata read in step 281 may be reused in the decoding step 285. In other examples, the metadata can optionally be re-read in step 284.

After joint decoding in step 288, the metadata can be recovered, and it can be determined whether the metadata were successfully recovered. As explained above, in some examples, determining step 289 can include parity checking the recovered metadata or use of a similar error detecting method. In some embodiments, when the metadata were not successfully decoded with the first redundancy code, the method can indicate a read failure in step 290.

Thus, in some embodiments, the metadata can be encoded more than two times. Thus, the method of recovering metadata can include decoding the metadata any number of times. For example, the metadata can be (i) encoded independently from the user data, once with a "weak" redundancy code and once with a "strong" redundancy code and (ii) encoded together with user data using a "joint" redundancy code. As a result, in some examples, methods of recovering the metadata can include sequentially attempting to recover the metadata with the weak, the strong, and the joint redundancy codes.

Thus, it can be seen that the present invention enables independent access and recovery of metadata without the need to read the user data portion. In some examples, it is only after the metadata is not successfully recovered independent of the user data that the user data is read.

Exemplary Apparatuses for Encoding Metadata

Aspects of the present invention relate to apparatuses for encoding metadata at least once individually and once along with user data. It is to be appreciated that circuit(s), algorithm(s), and/or software can generally be configured to implement such encoders embodying the inventive concepts described below. In some examples, and referring now to FIG. 10, an encoder 300 can be implemented using one or more Application Specific Integrated Circuits (ASICs), Field Programmable Gate Arrays (FGPAs), discrete analog or digital elements, processors, and/or microcontrollers. In other examples, encoders may be implemented in software or firmware. Moreover, the encoder can be incorporated into, or in communication with, the storage devices 350 in which encoded user data and metadata are stored. For example, and without limitation, encoders can be incorporated into storage devices such as a hard disk drive, a compact disk or DVD drive, or a flash-based memory controller. In other examples, the encoder may be separate from, but in communication with, one or more storage devices.

In some embodiments, the encoder 300 can include at least one input 302 receiving user data and metadata to be written to a storage medium 370; logic 330 configured to generate a first redundancy code corresponding to both the user data and the metadata; logic 320 configured to generate a second redundancy code corresponding to the metadata without the user data; and an output 304 providing encoded data to a data recording mechanism 360 for the storage medium 370, wherein the encoded data includes the user data, the metadata, the first redundancy code, and the second redundancy code. While the exemplary encoder 300 is shown as two parallel encoders 320 and 330, it is within the ability of one skilled in the art to implement encoder 300 as a single encoder or as more than two encoders (which may be arranged serially and/or in parallel).

In some examples, and without limitation, the storage device 350 can be a hard disk drive and the storage medium 370 can be one or more magnetic platters. In other examples, the storage device 350 can be an optical disk drive such as a compact disk drive or a digital versatile disk drive, and the storage medium 370 can be an optical disk such as a compact disk or a digital versatile disk. However, it is to be appreciated that other storage devices and media are contemplated in accordance with embodiments of the present invention.

When it is desired to write the user data and the metadata to the storage device 350, data may be passed to, or received by, at least one input 302 of the "metadata redundancy" encoder 320 and the joint metadata and user data encoder 330. In some examples, and without limitation, the encoder input 302 can be a physical input for receiving a data waveform, such as, for example and without limitation, a parallel bus, a serial bus, and the like. In other examples, the encoder input can be a logical input for accessing data stored in a memory 310. For example, and without limitation, the encoder can be configured to access a shared memory space and retrieve therefrom the user data and metadata to be encoded. It is to be appreciated, however, that other types of inputs are contemplated in accordance with some embodiments of the present invention.

In some examples, and without limitation, the encoder logic (e.g., encoding logic 334) can be configured to generate the first redundancy code by performing one or more logical and/or mathematical operations on both the user data and the metadata. Similarly, in some examples, and without limitation, the encoder logic (e.g., metadata encoding logic 325) can be configured to generate the second redundancy code by performing one or more logical and/or mathematical operations on only the metadata. Alternatively, in other examples, and without limitation, the encoder logic 324 may be configured to provide relatively "weak" second redundancy code for the metadata, and encoding logic 325 can be configured to generate relatively "strong" second redundancy code, by performing one or more logical and/or mathematical operations on only the metadata.

In some examples, and without limitation, the data to be encoded (i.e., the user data and metadata together and/or the metadata independently) may be convolutionally encoded by sequentially passing the data through a series of memory registers (e.g., registers 332 and 333 in joint encoder 330). In other examples, the data to be encoded may be convolutionally encoded by separating the data and passing the separated data through two or more parallel series of memory registers (e.g., using registers 322 and 323, which may, in one embodiment, separately store user data and metadata, respectively). In some examples, and without limitation, the encoding logic may be non-recursive (e.g., there is no feedback component of the memory registers). In other examples, the encoding logic may be recursive. It is within the abilities of those skilled in the art to implement encoding logic corresponding to redundancy codes of the type contemplated herein.

In various implementations, the first and second redundancy codes can independently include a Bose-Chaudhuri-Hocquenghem code, a Reed-Solomon code, a Low-Density Parity-Check code, a Hamming code, a Reed-Muller code, a Binary Golay code, a Viterbi code, a Turbo code, an Optimal Rectangular code, an iterative code, or a combination thereof, generally as described herein. For example, the first and second redundancy codes can include the same or different types of error correcting codes, and the second redundancy code can also include one or more parity bits, a checksum, a Cyclic Redundancy Check (CRC), or a combination thereof. In one implementation, the second redundancy code may include a CRC code to mitigate potential correction errors which may be introduced by the second redundancy code. In another implementation, the second redundancy code can have a total length of 9 bits, where 8 bits are allocated to an error correction code (for example, and without limitation, a Hamming code) and 1 bit is allocated to a parity bit. It is to be appreciated that there are other combinations and configurations of error correcting and error detecting codes which are contemplated in accordance with embodiments of the present invention.

In general, the first redundancy code has a failure rate probability less than that of the second redundancy code. Thus, the encoding logic can be configured to generate the first redundancy code using an allocation of the available redundancy storage space and/or an encoding technique that provides greater reliability than that used for the second redundancy code, as generally described herein.

Also as discussed herein, the encoder 300 can be configured to provide a first encoded data signal at output 304 including the encoded user data, the encoded metadata, and the second (e.g., metadata only) redundancy code, and separately, a second encoded data signal at output 306 including the jointly encoded user data and metadata and the first redundancy code (e.g., for both the user data and the metadata), to a data storage mechanism 360 for the storage medium 370. In some examples, and without limitation, the data storage mechanism 360 may include a magnetic write head configured to selectively magnetize one or more regions of a ferromagnetic platter or disk. In other examples, the data storage mechanism 360 may include a laser configured to selectively heat parts of a dye layer of an optical disk. In other examples, the data storage mechanism 360 may include one or more sensing and/or charging circuits for selectively charging or discharging (e.g., programming) an array of memory elements.

In some examples, and without limitation, the metadata redundancy encoder 320 can be configured to store the user data and the metadata in temporary memory (e.g., a multiport memory, a first-in-first-out memory, or other buffer 321), and thereafter construct the encoded data signal by reading the temporary memory. In certain embodiments, a clock or other timing circuit (e.g., 326 and/or 336) may provide appropriate timing signals to the various components of the encoder 320 or 330. The encoder 300 (or first and second encoders 320 and 330) may include an output circuit (e.g., 327 and/or 338) configured to transfer the encoded data to another circuit or data/signal processing block (e.g., data recording mechanism 360). The output circuit may include one or more output buffers, one or more output drivers, and in the case of output circuit 327, a data or input selection circuit (such as a multiplexer) configured to select one of a plurality of inputs to output from the first encoder 320. Such a selection circuit may be controlled by an output control block 328, adapted to select a predetermined input in response to an occurrence of a corresponding predetermined event (e.g., a synchronization or other bit or pattern identifying encoded user data or encoded metadata).

Figure 10:
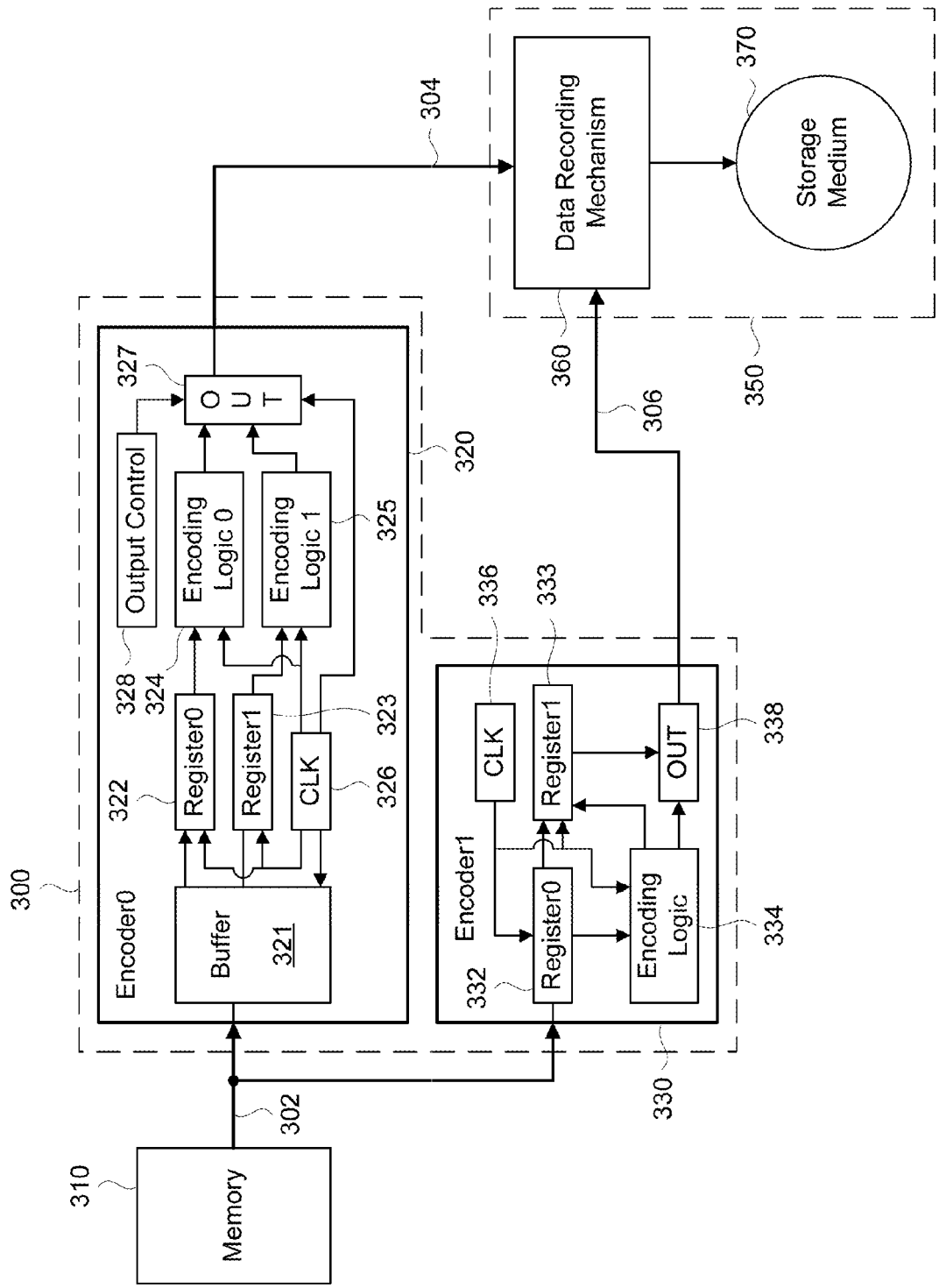
FIG. 10 is a block diagram showing an exemplary encoding system and/or apparatus in accordance with embodiments of the present invention.

In the example shown in FIG. 10, the first encoder 320 may encode user data and metadata separately, and the second encoder 330 may encode user data and metadata together. Thus, each of encoding logic 324, 325 and 334 may function as a CRC calculator or parity calculator, thereby adding ECC/CRC code and/or one or more parity bits to the encoded data to be recorded. In general, the first encoder 320 can be configured to provide each of the separately encoded user data, the separately encoded metadata, and the separate user data and metadata redundancy codes to the data storage mechanism 360 by placing the data on a bus 304 configured to transfer data into the storage device 350, and the second encoder 330 can be configured to provide the jointly encoded user data and metadata, and the first redundancy code (for both user data and metadata together) to the data storage mechanism 360 by placing the data on a bus 306 configured to transfer data into the storage device 350. It is well within the abilities of those skilled in the art to implement circuitry and/or other hardware for providing the encoded data signal to the data storage mechanism.

Exemplary Apparatuses for Decoding Metadata

Other aspects of the present invention relate to apparatuses for decoding metadata that has been encoded at least once individually and once along with user data. It is to be appreciated that circuit(s), algorithm(s), and/or software can generally be configured to implement decoders embodying the inventive concepts described below. In some embodiments, and referring to FIG. 11, the decoder 400 can include one or more inputs 402, 404 receiving stored data from a data reading mechanism 460 for a storage medium 470, wherein the stored data includes (i) a representation of both user data and metadata jointly encoded with a first redundancy code and (ii) a representation of the metadata encoded with a second redundancy code; and logic configured to decode the stored data and provide the metadata from the storage medium 470. The jointly encoded user data and metadata, the first redundancy code, the separately encoded user data, the separately encoded metadata and the second redundancy code may each be stored separately on the storage medium 470, and they may be retrieved or read from the storage medium 470 serially or in parallel. In various embodiments, the jointly encoded user data and metadata and the first redundancy code are read serially from a first storage medium, and the separately encoded user data, separately encoded metadata and second redundancy code are read serially from the same or a different storage medium, and in the latter case, the different serial data streams may be read in parallel.

In some examples, and without limitation, the decoder 400 can be implemented using one or more Application Specific Integrated Circuits (ASICs), Field Programmable Gate Arrays (FGPAs), discrete analog or digital elements, processors, and/or microcontrollers. In other examples, the decoder 400 may be implemented in software or firmware. Moreover, it is to be appreciated that the decoder can be incorporated into, or in communication with, a storage device 450. For example, and without limitation, the decoder 400 can be incorporated into a storage device 450 such as a hard disk drive, a compact disk or DVD drive, or a flash-based memory or random access memory controller. In other examples, the decoder 400 may be separate from, but in communication with, one or more storage devices 450. While the exemplary decoder 400 is shown as two parallel decoders 420 and 430, it is within the ability of one skilled in the art to implement decoder 400 as a single decoder or as more than two decoders (which may be arranged serially and/or in parallel).

In some examples, and without limitation, the storage device 450 can be a hard disk drive and the storage medium 470 can be one or more magnetic platters. In some examples, and without limitation, the data reading mechanism 460 may include a magnetic read head configured to selectively sense the magnetization of one or more regions of a ferromagnetic platter. In other examples, the storage device 450 can be an optical disk drive such as a compact disk drive or a digital versatile disk drive, and the storage medium 470 can be an optical disk such as a compact disk or a digital versatile disk. In some examples, the data reading mechanism 460 may include a laser and a photodiode configured to selectively sense pits and lands of a dye layer of an optical disk. In other examples, the storage device 450 can comprise a plurality of solid state memory elements, and the data reading mechanism 460 may include one or more sensing and/or detecting circuits for selectively sensing the charge of the memory elements in a solid state memory element. However, it is to be appreciated that other storage devices, media, and data reading mechanisms are contemplated in accordance with embodiments of the present invention.

The decoding logic 400 may be configured to perform logical and/or mathematical operations that are complementary to the logical and/or mathematical operations which were performed to encode the data before it was written to the storage medium 470. In the example shown in FIG. 11, the first decoder 420 may separately decode user data and metadata, the latter in accordance with the second redundancy code, and the second decoder 430 may decode user data and metadata together in accordance with the first redundancy code. For example, and without limitation, each of decoding logic 424, 425 and 434 may function as an error checking and/or correction circuit, thereby using any received ECC/CRC code and/or parity bit(s) to determine whether errors exist in the received data, and if so, to correct such errors. Furthermore, the decoding logic 424 and 425 may be configured to decode the stored user data and metadata with the known coding constraints and the second redundancy codes, respectively. Alternatively, the decoder logic 324 may be configured to decode the metadata using a relatively "weak" second redundancy code, and decoding logic 325 can be configured to decode the metadata using relatively "strong" second redundancy code. In some examples, and without limitation, the decoding logic may be non-recursive (i.e., there is no feedback component of the memory registers). In other examples, the decoding logic may be recursive. In other examples, and without limitation, the decoder can comprise discrete logic and/or software implementing a probabilistic decoding algorithm, such as a Viterbi algorithm.

In some examples, and without limitation, the decoder can be configured to receive stored data which may have user data, metadata, and redundancy code portions, and store the received data into a temporary memory (e.g., input buffer 431 and/or buffer 421). The temporary memory may be the same as buffer 321 in FIG. 10. Referring back to FIG. 11, in some examples, the decoder 400 can receive and store data corresponding to an entire sector of a hard disk drive. When stored in temporary memory (e.g., buffer 421), the decoder 400 can include a memory controller or other logic and/or control circuitry (e.g., memory controller 429) configured to identify those data portions which correspond to the user data, the metadata, and the second redundancy code.

In some examples, and without limitation, the first decoder 420 can identify the portions of the received data that may have a known fixed data length (for example, and without limitation, the first 4 kilobytes that may correspond to user data, the next 80 bytes that may correspond to metadata, and the 20 bits that may correspond to the second redundancy code). In other examples, the start and/or end of each portion of the stored data signal may have pattern indicia such as headers, trailers, and/or synchronization bits (e.g., which can be identified by memory controller 429). It is to be appreciated that other stored data signals are contemplated in accordance with embodiments of the present invention.

The decoding logic (e.g., 424, 425 and 434) can be configured to decode the stored data signal (or one or more portions thereof) by performing one or more logical or mathematical operations on the representations of the user data, the metadata, and the redundancy codes. In some examples, and without limitation, the redundancy codes may correspond to polynomial coefficients of a convolutional error correcting code. In other examples, the redundancy codes may correspond to replication or parity data. In some examples, and without limitation, the data can be convolutionally decoded by passing the data through a series of memory registers (e.g., registers 432 and 433). In other examples, the data to be decoded may be convolutionally decoded by running the data through two or more parallel memory registers (e.g., registers 422 and 423).

In some examples, the decoder 400 can be configured to provide the metadata by independently decoding the portion of the stored data corresponding to the metadata alone with the portion of the stored data corresponding to the second redundancy code, for example using second decoding logic 425. For example, and without limitation, the decoder 400 can receive a stored data signal from the data reading mechanism 460 and provide the metadata portion and second redundancy code portion to discrete circuitry (e.g., decoding logic 425) implementing a probabilistic decoding algorithm. In other examples, the metadata portion and second redundancy code portion of the stored data signal can be provided to discrete circuitry implementing Hamming-decoding functions. Similarly, the decoder 400 can be configured to provide the metadata by jointly decoding the portion of the stored data corresponding to both the user data and the metadata with the portion of the stored data corresponding to the first redundancy code, for example using decoding logic 434. For example, and without limitation, the decoder 430 can be configured to provide the data corresponding to the user data, the metadata, and the first redundancy code received from the data reading mechanism 460 to discrete circuitry (e.g., decoding logic 434) implementing Hamming-decoding functions.

In some embodiments, the decoding logic 400 can be further configured to provide the metadata by first decoding the representation of the metadata with the second redundancy code, then jointly decoding the representation of both the user data and the metadata with the first redundancy code. For example, the decoder 420 can be configured to first attempt to recover the metadata from the encoded data signal by decoding only the portion of the stored data signal including the metadata with the portion of the stored data signal including the second redundancy code. If decoding is unsuccessful (i.e., errors are detected in the decoded metadata at output 406), thereafter, the joint decoder 430 can attempt to recover the metadata by jointly decoding the portions of data including the user data and the metadata with the portion of the stored data signal including the first redundancy code. It is within the ability of those skilled in the art to design appropriate control signals (e.g., to memory controller 429 and input buffer 431, or to output controller 427 and output buffer 438) to implement the decoding sequence described in this paragraph.

In some examples, and without limitation, the decoder 400 may include a clock or other timing circuit (e.g., 426 and/or 436) that may provide appropriate timing signals to the various components of the decoder 420 or 430. The decoder 400 (or first and second decoders 420 and 430) may include an output circuit (e.g., 427 and/or 438) configured to transfer the decoded data to another circuit or data/signal processing block. The output circuit may include one or more output buffers, one or more output drivers, and in the case of output circuit 427, a data or input selection circuit (such as a multiplexer) configured to select one of a plurality of inputs. Such a selection circuit may be controlled by an output control block 428, adapted to select a predetermined input in response to an occurrence of a corresponding predetermined event.

Figure 11:
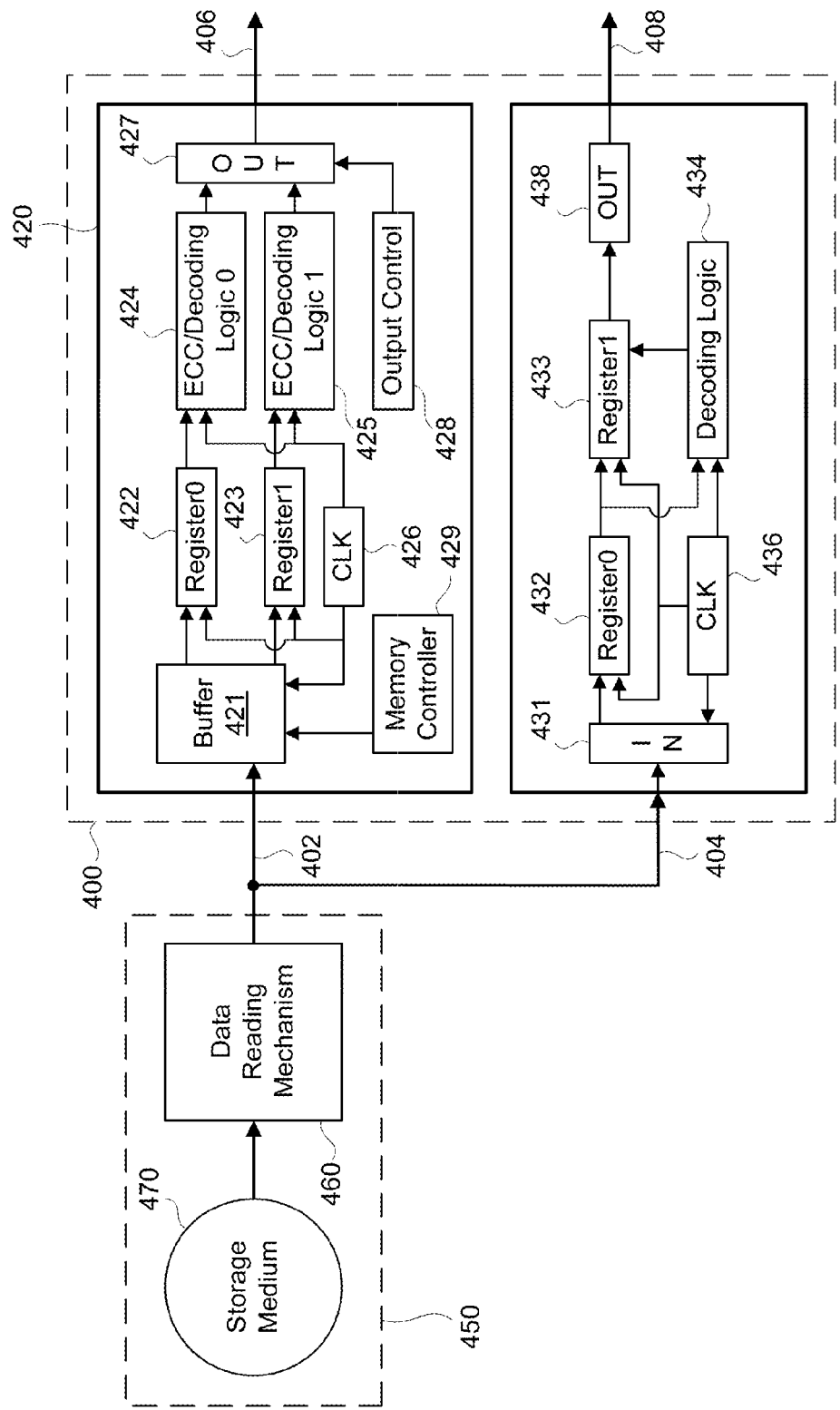
FIG. 11 is a block diagram showing an exemplary decoding system and/or apparatus in accordance with embodiments of the present invention.

In the example shown in FIG. 11, the metadata decoder 420 can be configured to provide decoded and error-corrected user data and metadata to a downstream circuit or device by placing the data on a bus 406 configured to transfer data to the downstream circuit or device, and the joint decoder 430 can be configured to provide the jointly decoded and error-corrected user data and metadata to a downstream circuit or device by placing the data on a bus 408 configured to transfer data to the downstream circuit or device. It is well within the abilities of those skilled in the art to implement circuitry and/or other hardware for providing the decoded data to the downstream circuit or device.

Exemplary Systems for Storing and Retrieving Metadata

Figure 12:
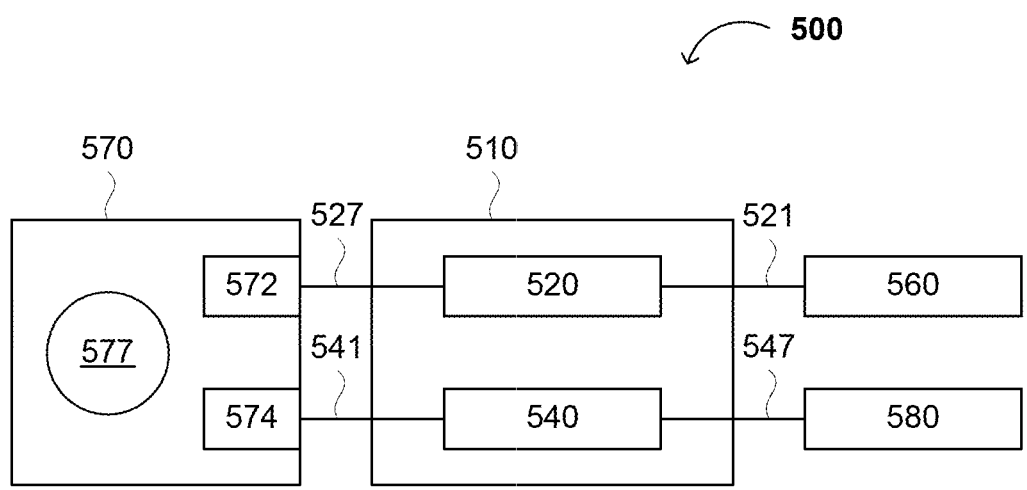
FIG. 12 is a block diagram showing an exemplary system and/or apparatus in accordance with embodiments of the present invention.

Other aspects of the present invention relate to systems for storing digital data having a first portion and a second portion. Referring now to FIG. 12, in some embodiments, the system can include a data storage medium 577 having a plurality of writable sectors; encoding logic 520 generating at least two redundancy codes corresponding to the digital data, wherein a first of the redundancy codes comprises a first error correcting code corresponding to both the first portion and the second portion of the digital data, and a second of the redundancy codes comprises a second error correcting code corresponding to the second portion of the digital data without the first portion of the digital data; a data recording mechanism 572 configured to write the digital data and the redundancy codes in one of the writable sectors; a reader 574 configured to read a representation of the digital data and a representation of the redundancy codes from the writable sector; and decoding logic 540 configured to decode the digital data from the writable sector.

FIG. 12 shows an exemplary data storage system 570 for storing and retrieving user data and metadata. In some examples, and without limitation, data storage system 570 can be a hard disk drive. In other examples, data storage system 570 can be an optical disk drive. In yet other examples, data storage system 570 can be a solid state memory drive, such as, for example, a flash drive (e.g., a flash-based memory stick). However, other types of data storage systems are contemplated in accordance with embodiments of the present invention.

In some examples, and without limitation, data storage system 570 can include one or more data storage media 577, a data recording mechanism 572, and a reader 574. In some specific implementations, data storage system 570 can be a hard disk drive, and the data storage medium can include one or more magnetic disks. In other examples, data storage system 570 can be an optical disk drive containing one or more optical disks. However, it is to be appreciated that, in accordance with some embodiments of the present invention, the data storage medium can include at least one magnetic disk, optical disk, magneto-optical disk, memory storage element, or combination thereof. It is also to be appreciated that storage medium 577 may be fixed within storage system 570 (as would typically be the case when storage system 570 is a hard disk drive) or, storage medium 577 may be removable from storage system 570 (as would typically be the case when storage system 570 is an optical disk drive or a magnetic tape drive).

As above, storage system 570 may also include a data recording mechanism 572 configured to write data to sectors of storage medium 577. In some examples, and without limitation, data recording mechanism 572 can be a write head of a magnetic storage system 570, configured to selectively magnetize one or more regions of a ferromagnetic platter. In other examples, data recording mechanism 572 can be a laser of an optical storage system 570 and be configured to selectively irradiate and/or heat parts of a dye layer of an optical disk. In other examples, data recording mechanism 572 can comprise sensing and/or charging circuits of a solid state memory storage system 570 for selectively charging or discharging storage locations in an array of solid state memory elements (e.g., a flash memory-based system such as a memory stick).

Similarly, data storage system 570 may also include reader 574. In some examples, and without limitation, reader 574 can be a magnetic read head, and laser and/or photodiode, or sensing and/or detecting circuits. It is within the abilities of those skilled in the art to implement different combinations of storage media 577, data recording mechanisms 572, and readers 574 for a particular storage system 570.

In some examples, and without limitation, data recording mechanism 572 can be in communication with encoder 520 comprising encoding logic. Similarly, and without limitation, reader 574 can be in communication with decoder 540 comprising decoding logic. In some examples, and as shown in FIG. 12, encoder 520 and decoder 540 may comprise distinct circuits. For example, and without limitation, encoder 520 may comprise a first Application Specific Integrated Circuit (ASIC), and decoder 520 may comprise a second ASIC. However, it is to be appreciated that both encoder 520 and decoder 540 may be included in a single codec 510. In some examples, and without limitation, codec 510 may comprise a single ASIC or Field Programmable Gate Array (FPGA). In other examples, codec 510 may comprise a number of distinct digital and/or analog components. In some examples, and without limitation, encoder 520 can include an input for receiving digital data from a data write buffer 560. Similarly, in some examples, and without limitation, decoder 540 can include an output for providing recovered data to a data read buffer 580. In other examples, decoder 540 can include an output for providing data to a memory location. It is further to be appreciated that it is within the abilities of those skilled in the art to implement encoder 520 and/or decoder 540 with various circuitry, algorithms, inputs, outputs, firmware, software, and the like in conjunction with embodiments of the present invention as described above and below.

In some examples, and without limitation, encoder 520 may be configured to receive digital data 521 having at least two portions, and provide write signal data 527 to data recording mechanism 572 in response thereto. As above, encoder 520 can be configured to generate at least two redundancy codes corresponding to the one or more portions of digital data 521. In some examples, a first redundancy code can correspond to or be derived from the first portion of digital data 521, and a second redundancy code can correspond to or be derived from the second portion of digital data 521. In some examples, and without limitation, write signal 527 may include representations of the first and second portions of digital data 521 in addition to the redundancy codes. In other examples, and without limitation, decoder 540 may receive data 541 from the reader, wherein data 541 may correspond to the first and second portions of digital data and the corresponding redundancy codes which had previously been written to storage medium 577. Decoder 540 may be configured to decode data 541 and provide a read signal 547 in response thereto. In yet another example, the decoder 540 may receive data 541 from the reader, wherein data 541 may correspond to the second portion of the digital data (e.g., the metadata) along with the second redundancy code (e.g., derived from the metadata). In some specific implementations, the encoder can be configured such that the first redundancy code and second redundancy code can have failure rate probabilities in accordance with descriptions elsewhere herein.

In some embodiments, the decoder 540 can be configured to decode the digital data by independently decoding (i) the first portion of the digital data with the first redundancy code and (ii) the second portion of the digital data with the second redundancy code. For example, and without limitation, decoder 540 can decode the first portion of data 541 received from reader 574 (and previously written to storage medium 577) with its corresponding redundancy code (i.e., the first redundancy code). Decoder 540 can also be configured to decode the second portion of data 541 received from reader 574 (and previously written to storage medium 577) with a corresponding second redundancy code. In some specific implementations, the decoding logic can be configured to first decode the second portion of the digital data, and if the decoding fails, then decode the first portion of the digital data. For example, and without limitation, decoder 540 need first only receive the second portion of data 541 and its corresponding redundancy code. If decoding of the second portion of data 541, previously encoded by encoder 520 and written to storage medium 577 is unsuccessful, the decoder can thereafter receive the first portion of data 541 and its corresponding redundancy code. In this case, decoder 540 can attempt to recover data 541 using the "stronger" redundancy code. In some specific implementations, the first portion of the digital data can include the second portion of the digital data.

For example, and without limitation, the second portion of data can include data Y (e.g., metadata) and the first portion of data can include data X multiplexed with data Y. Thus, it is to be appreciated that in some embodiments, data Y can be encoded and thus decoded independently with a first "weaker" redundancy data and again jointly along with data X with a second "stronger" redundancy data. In some specific implementations, and in accordance with one or more embodiments of the present invention, the first portion of the digital data can include both user data and metadata, and the second portion of the digital data includes only the metadata.

Exemplary Software

The present invention also includes algorithms, computer program(s) and/or software, implementable and/or executable in a general purpose computer or workstation equipped with a conventional digital signal processor, configured to perform one or more steps of the method(s) and/or one or more operations of the hardware. Thus, a further aspect of the invention relates to algorithms and/or software that implement the above method(s). For example, the invention may further relate to a computer program or computer-readable medium containing a set of instructions executable by a general purpose computer and/or an appropriate processing device (e.g., a signal processing device, such as a microcontroller, microprocessor or DSP device) that is configured to perform the above-described method and/or algorithm.

For example, the computer program may be on any kind of readable physical medium, and the computer-readable medium may comprise any medium that can be read by a processing device configured to read the medium and execute code stored thereon or therein, such as a floppy disk, CD-ROM, DVD, magnetic tape or hard disk drive. Such code may comprise object code, source code and/or binary code.

The code is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

CONCLUSION/SUMMARY

Thus, embodiments of the present disclosure provide methods, apparatuses, systems, and architectures for encoding metadata at least twice, at least once independently and at least once jointly along with user data, thus providing fast, independent, and reliable retrieval of the metadata alone wherein there is minimum degradation in the reliability of the user data.

The foregoing descriptions of embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of storing data having a first portion and a second portion in a storage system, said method comprising:
   jointly encoding said first portion and said second portion with a first redundancy code having a length of R;
   encoding said second portion with a second redundancy code having a length of P, wherein R and P correspond to decoding failure rate probabilities of F and H, respectively, and F is less than H;
   writing each of said first portion, said second portion, said first redundancy code, and said second redundancy code together in said storage system.

2. The method of claim 1, wherein said second portion comprises metadata.

3. The method of claim 2, wherein said first portion comprises user data.

4. The method of claim 1, wherein said first redundancy code comprises a first error correcting code, and said second redundancy code comprises a second error correcting code.

5. The method of claim 4, wherein each of said first error correcting code and said second error correcting code is independently a Bose-Chaudhuri-Hocquenghem code, a Reed-Solomon code, a Low-Density Parity-Check code, a Hamming code, a Reed-Muller code, a Binary Golay code, a Viterbi code, a Turbo code, an Optimal Rectangular code, an iterative code, or a combination thereof.

6. The method of claim 1, further comprising encoding said second portion with a third redundancy code having a length of S.

7. The method of claim 6, wherein said third redundancy code comprises an error correction code selected from the group consisting of one or more parity bits, a checksum, a Cyclic Redundancy Check, and combinations thereof.

8. The method of claim 6, wherein R, S, and P correspond to failure rate probabilities of F, G, and H, respectively, and wherein F is less than G, and G is less than H.

9. A method of recovering a portion of data having a first portion and a second portion, comprising:
   reading from a storage system a portion of data including said second portion, wherein
      the first and second portions of said data are jointly encoded with a first redundancy code having a length R,
      said second portion is encoded with a second redundancy code having a length P, wherein R and P correspond to decoding failure rate probabilities of F and H, respectively, and F is less than H, and
      said first and second portions, said first redundancy code, and second redundancy code are written together in the storage system;
   reading from said storage system a portion of said data including said second redundancy code;
   decoding said second portion with said second redundancy code; and
   indicating whether said second portion was successfully decoded with said second redundancy code.

10. The method of claim 9, wherein said step of indicating whether said second portion was successfully decoded comprises error checking the decoded second portion.

11. The method of claim 9, further comprising, when said second portion is not successfully decoded with said second redundancy code:
   reading from said storage system a portion of data including said first portion and a portion of data including said first redundancy code;
   decoding said first portion and said second portion together with said first redundancy code; and
   indicating whether said first portion and said second portion were successfully decoded with said first redundancy code.

12. An encoder comprising:
   at least one input receiving first portion and second portion to be written to a storage medium;
   logic configured to generate (i) a first redundancy code having a length R jointly from said first portion and said second portion and (ii) a second redundancy code having a length P, from said second portion without said first portion, wherein R and P correspond to decoding failure rate probabilities of F and H, respectively, and F is less than H; and
   an output providing encoded data to a data recording mechanism for said storage medium, wherein said encoded data comprises said first portion, said second portion, said first redundancy code, and said second redundancy code.

13. The encoder of claim 12, wherein each of said first redundancy code and said second redundancy code independently comprises a Bose-Chaudhuri-Hocquenghem code, a Reed-Solomon code, a Low-Density Parity-Check code, a Hamming code, a Reed-Muller code, a Binary Golay code, a Viterbi code, a Turbo code, an Optimal Rectangular code, an iterative code, or a combination thereof, and said second redundancy code further comprises one or more parity bits, a checksum, a Cyclic Redundancy Check, or a combination thereof.

14. The encoder of claim 12, wherein said logic comprises a first memory storage element configured to store said first and second portions, first encoding logic configured to encode said first and second portions and generate said first redundancy code, a second memory storage element configured to store at least said second portion, and second encoding logic configured to encode said second portion without said first portion and generate said second redundancy code.

15. The encoder of claim 12, wherein said first redundancy code has a decoding failure rate probability less than that of said second redundancy code.

16. A decoder, comprising:
   an input receiving stored data from a data reading mechanism of a storage medium, wherein said stored data comprises (i) a representation of both first portion and second portion jointly encoded with a first redundancy code having a length R and (ii) a representation of said second portion encoded with a second redundancy code having a length P, wherein R and P correspond to decoding failure rate probabilities of F and H, respectively, and F is less than H; and logic configured to decode said stored data and provide said second portion from said storage medium.

17. The decoder of claim 16, wherein said logic is further configured to provide said second portion by first decoding said representation of said second portion with said second redundancy code.

18. The decoder of claim 17, wherein said logic is further configured to provide said second portion by jointly decoding said representation of both said first portion and said second portion with said first redundancy code when decoding said representation of said second portion with said second redundancy code fails.

19. The decoder of claim 16, wherein said logic comprises a first memory storage element configured to store said first and second jointly encoded portions and said first redundancy code, first decoding logic configured to decode said first and second portions according to said first redundancy code, a second memory storage element configured to store at least said second portion encoded with said second redundancy code, and second decoding logic configured to decode said second portion according to said second redundancy code.

* * * * *